US008653751B2

(12) United States Patent
Shimizu et al.

(10) Patent No.: US 8,653,751 B2
(45) Date of Patent: Feb. 18, 2014

(54) LED DRIVE CIRCUIT AND LED ILLUMINATION COMPONENT USING THE SAME

(75) Inventors: Takayuki Shimizu, Osaka (JP); Atsushi Kanamori, Osaka (JP); Hirohisa Warita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 336 days.

(21) Appl. No.: 13/189,250

(22) Filed: Jul. 22, 2011

(65) Prior Publication Data

US 2012/0049755 A1 Mar. 1, 2012

(30) Foreign Application Priority Data

Aug. 24, 2010 (JP) .................................. 2010-187697

(51) Int. Cl.
*H05B 37/02* (2006.01)
(52) U.S. Cl.
USPC .......................................... 315/299; 315/308
(58) Field of Classification Search
USPC ....................... 315/209 R, 224, 291, 299, 308
See application file for complete search history.

(56) References Cited

U.S. PATENT DOCUMENTS

| 7,821,237 | B2 * | 10/2010 | Melanson | 323/222 |
| 2007/0103949 | A1 * | 5/2007 | Tsuruya | 363/125 |
| 2010/0327835 | A1 * | 12/2010 | Archibald | 323/282 |

FOREIGN PATENT DOCUMENTS

| JP | 2004-327152 A | 11/2004 |
| JP | 2005-026142 A | 1/2005 |
| JP | 2006-319172 A | 11/2006 |
| JP | 2007-538378 A | 12/2007 |
| JP | 2008-104273 A | 5/2008 |
| JP | 2009-284721 A | 12/2009 |

\* cited by examiner

*Primary Examiner* — Thuy Vinh Tran
(74) *Attorney, Agent, or Firm* — Birch, Stewart, Kolasch & Birch, LLP

(57) ABSTRACT

An LED drive circuit is provided that can be connected to an alternating current power source via a phase-control light controller and drives an LED load. The LED drive circuit includes: a switching power source portion having a switching element, a switching current detection portion that detects a switching current, and an LED current detection portion that detects an LED current; a first subtraction portion that subtracts a given value from an output of the switching current detection portion; a first determination portion that determines, through computation on a plurality of externally inputted voltages, a target value to which the switching current is limited; a second subtraction portion that subtracts a given value from an output of the LED current detection portion; a second determination portion that determines, through computation on a plurality of externally inputted voltages, a target value of the LED current; a switching current limitation portion that, if a result of the subtraction by the first subtraction portion exceeds a result of the determination by the first determination portion, switches off the switching element so as to limit the switching current; and an LED current control portion that drives the switching element to control the LED current so that a result of the subtraction by the second subtraction portion coincides with a result of the determination by the second determination portion.

10 Claims, 18 Drawing Sheets

PHASE ANGLE = 0°

PHASE ANGLE = 45°

PHASE ANGLE = 90°

PHASE ANGLE = 135°

--- AVERAGE VALUE
−·−· (A × EDGE VALUE)²
—— AVERAGE VALUE − (A × EDGE VALUE)²

PHASE ANGLE OF LIGHT CONTROLLER (0°)

PHASE ANGLE OF LIGHT CONTROLLER (45°)

PHASE ANGLE OF LIGHT CONTROLLER (90°)

PHASE ANGLE OF LIGHT CONTROLLER (135°)

LED DRIVE CIRCUIT AND LED ILLUMINATION COMPONENT USING THE SAME

This application is based on Japanese Patent Application No. 2010-187697 filed on Aug. 24, 2010, the contents of which are hereby incorporated by reference.

BACKGROUND OF THE INVENTION

1. Field of the Invention

The present invention relates to an LED drive circuit and an LED illumination component using the same.

2. Description of the Prior Art

An LED (light-emitting diode) is characterized by its low current consumption, long life, and so on, and its range of applications has been expanding not only to display devices but also to illumination apparatuses and the like. An LED illumination apparatus often uses a plurality of LEDs in order to attain desired illuminance (see, for example, JP-A-2004-327152, JP-A-2006-319172, and JP-A-2008-104273).

A general-use illumination apparatus often uses a commercial alternating current power source, and considering, for example, a case where an LED illumination component is used in place of a general-use illumination component such as an incandescent lamp, it is desirable that, similarly to a general-use illumination component, an LED illumination component also be configured to use a commercial alternating current power source.

Furthermore, in seeking to perform light control of an incandescent lamp, a phase-control light controller (referred to generally as an incandescent light controller) is used in which a switching element (generally, a thyristor element or a triac element) is switched on at a certain phase angle of an alternating current power source voltage and that thus allows light control through control of power supply to the incandescent lamp to be performed easily with a simple operation of a volume element (see, for example, JP-A-2005-26142). It is known, however, that in performing light control of a low-wattage incandescent lamp by use of a phase-control light controller, connecting the incandescent lamp to the light controller leads to the occurrence of flickering or blinking, so that the light control cannot be performed properly.

It is desirable that in seeking to perform light control of an LED illumination component that uses an alternating current power source, the LED illumination component be connectable as it is to an existing phase-control light controller for an incandescent lamp. By changing only an illumination component to an LED illumination component while using existing light control equipment therewith, compared with a case of using an incandescent lamp, power consumption can be reduced considerably. Furthermore, this can also secure compatibility without requiring the light control equipment to be changed to a type used exclusively for an LED illumination component and thus reduces equipment cost.

Now, FIG. 16 shows a conventional example of an LED illumination system capable of performing light control of an LED illumination component that uses an alternating current power source. An LED illumination system shown in FIG. 16 includes a phase-control light controller 200, an LED drive circuit 300 having a diode bridge DB1 and a current limitation portion IL, and an LED array 400 formed by connecting LEDs in series. The phase-control light controller 200 is connected in series between a commercial power source 100 that is an alternating current power source and the current limitation portion IL. In the phase-control light controller 200, a resistance value of a variable resistor Rvar is made to vary, and a triac Tri is thus switched on at a power source phase angle depending on the resistance value. Typically, the variable resistor Rvar is built in the form of a rotary knob or a slider and so configured that changing an angle of rotation of the knob or the position of the slider allows light control of the illumination component. Moreover, in the phase-control light controller 200, a capacitor Ca and an inductor L constitute a noise suppression circuit that reduces noise fed back into an alternating current power source line from the phase-control light controller 200. FIG. 17 shows output waveforms of the light controller and those of the diode bridge DB1, which correspond to phase angles of 0°, 45°, 90°, and 135° of the phase-control light controller 200, respectively. As the phase angle increases, an average value of a voltage of the output waveform of the diode bridge decreases. In a case where the LED illumination component is connected to the phase-control light controller 200, as the phase angle of the light controller increases, resulting brightness decreases.

When the phase angle of the phase-control light controller 200 is increased to decrease resulting brightness of the LEDs, if an output voltage of the diode bridge DB1 becomes smaller than a forward voltage (VF) obtained when the LED array 400 starts to glow, the LED array 400 no longer glows, and there occurs an abrupt decrease in current flowing through the light controller. Due to this abrupt decrease, the current flowing through the light controller falls below a level of an on-state holding current of the triac Tri in the light controller, so that the triac is switched off to halt the output of the light controller and thus to bring about an unstable state, which results in the occurrence of brightness flickering of the LED array 400. Furthermore, when the triac Tri is switched from an off-state to an on-state through phase control of the output of the light controller, the LEDs are switched from an off-state to an on-state, so that there occurs an abrupt variation in impedance of the LEDs. This might cause ringing to occur at an edge of an output voltage of the light controller, where the output voltage varies abruptly, so that the triac Tri is brought to an unstable state to be switched off, which results in the occurrence of brightness flickering. For the above-described reason, in an LED illumination system adapted to the use of a phase-control light controller, when LEDs are not glowing, a current drawing circuit that forcibly passes a holding current is used to prevent a triac from being switched off. In this case, however, a drawn current is all converted to heat, which leads to a deterioration in efficiency of the LED illumination system and also requires heat radiation measures to be taken.

In a case of using a conventional incandescent lamp load, since a filament of tungsten or the like constitutes the load, even if a triac of a phase-control light controller is switched from an off-state to an on-state, there hardly occurs a variation in impedance, and thus a low impedance state is maintained. Thus, there occurs no abrupt variation in current flowing through the phase-control light controller, so that a stable light control operation can be performed as long as an alternating current power source has a voltage value of around 0 V or higher.

Furthermore, in a case of the conventional example shown in FIG. 16, when an output voltage of the diode bridge DB1 is lower than a forward voltage (VF) obtained when the LED array 400 starts to glow, the LEDs are switched off, and assuming that the alternating current power source is at a frequency of 60 Hz, since full-wave rectification is performed by the diode bridge, the LEDs are switched on/off repeatedly at a frequency of 120 Hz that is double the alternating current power source frequency. This switching on/off of the LEDs causes flickering and might disadvantageously make it more likely that such flickering is perceived by a user when the user quickly moves his/her line of sight in an attempt to follow a quick move in a sporting event or the like. In a case of using an incandescent lamp, due to a filament that has a response speed on the order of 0.1 seconds and thus does not respond to an on/off operation at 120 Hz, flickering as described above does not occur to a noticeable degree. On the other hand, in a case of using an LED, since its response speed is a million or more times higher than that of a filament used in an incandescent lamp, flickering tends to occur to a noticeable degree.

Moreover, FIG. 18 shows a relationship (light control curve) between a phase angle θ of the phase-control light controller and illumination brightness in each of a case of the conventional LED illumination system shown in FIG. 16 and a case of an incandescent lamp illumination system. In the conventional LED illumination system, there occurs no variation in brightness at the phase angle θ=0° to 45°, while at θ=45° or larger, a light amount varies linearly, and at θ=130°, the LED illumination system is turned off. The incandescent lamp exhibits a curve characterized in that a light amount decreases mildly starting at θ=0°, which at θ=50° to 100°, varies along with the light control curve of the conventional LED illumination system and at θ=120° to 150°, decreases mildly. Brightness is perceived logarithmically by human eyes, and thus a characteristic that a light amount decreases mildly with respect to the phase angle θ is the key to fine control of a light amount at low illuminance. The conventional LED illumination system has been disadvantageous in that since it dims abruptly at around θ=130°, a light amount at a phase angle of around 120° to 150° cannot be controlled finely compared with a case of an incandescent lamp.

SUMMARY OF THE INVENTION

It is an object of the present invention to provide an LED drive circuit and an LED illumination component that finely control a switching current and an LED current so as to maintain a holding current of a phase-control light controller, and thus a phenomenon can be suppressed in which the light controller is brought to an unstable state to cause brightness flickering, and increased efficiency can also be achieved. Furthermore, it is another object of the present invention to enable light control that allows the occurrence of flickering to be suppressed and a light control curve approximating that of an incandescent lamp to be obtained, thus causing no feeling of discomfort.

The present invention is to provide an LED drive circuit that can be connected to an alternating current power source via a phase-control light controller and drives an LED load. The LED drive circuit includes: a switching power source portion having a switching element, a switching current detection portion that detects a switching current, and an LED current detection portion that detects an LED current; a first subtraction portion that subtracts a given value from an output of the switching current detection portion; a first determination portion that determines, through computation on a plurality of externally inputted voltages, a target value to which the switching current is limited; a second subtraction portion that subtracts a given value from an output of the LED current detection portion; a second determination portion that determines, through computation on a plurality of externally inputted voltages, a target value of the LED current; a switching current limitation portion that, if a result of the subtraction by the first subtraction portion exceeds a result of the determination by the first determination portion, switches off the switching element so as to limit the switching current; and an LED current control portion that drives the switching element to control the LED current so that a result of the subtraction by the second subtraction portion coincides with a result of the determination by the second determination portion (first configuration).

According to this configuration, a switching current and an LED current are controlled finely so that a holding current is maintained. This can suppress a phenomenon in which a current holding unit of the phase-control light controller is switched off to bring about an unstable state, which results in the occurrence of brightness flickering of the LED load, and can also achieve increased efficiency.

Furthermore, in the above-described first configuration, the switching power source portion may be formed of a booster circuit (second configuration). This can stabilize a forward voltage to be applied to the LED load and thus can suppress the occurrence of flickering.

Furthermore, in the above-described first configuration, the following may be adopted. That is, the first subtraction portion is a first error amplifier that obtains a difference between an output voltage of the switching current detection portion and a reference voltage, and the first determination portion is a second error amplifier that obtains a difference between a switching current limit set voltage and a first offset voltage. The second subtraction portion is a third error amplifier that obtains a difference between an output voltage of the LED current detection portion and the reference voltage, and the second determination portion is a fourth error amplifier that obtains a difference between an LED current set voltage and a second offset voltage. The switching current limitation portion has a comparator that compares an output of the first error amplifier with an output of the second error amplifier, and switches off the switching element based on an output of the comparator. The LED current control portion has a fifth error amplifier that obtains a difference between an output of the third error amplifier and an output of the fourth error amplifier and a PWM signal generation portion that generates a PWM signal in accordance with an output of the fifth error amplifier, and drives the switching element based on the PWM signal (third configuration).

Furthermore, in the above-described third configuration, the following may be adopted. That is, there are further provided: a circuit current detection portion that detects currents in the entire circuit; and a current drawing portion that draws a current. An output of the circuit current detection portion is used as the reference voltage, and based on the output of the circuit current detection portion, the current drawing portion draws the current so that the currents in the entire circuit are made constant (fourth configuration).

According to this configuration, control is performed so that a total of a switching current, an LED current, and a drawn current is made constant, and thus a holding current of the phase-control light controller can be maintained.

Furthermore, in the above-described fourth configuration, the following may be adopted. That is, the circuit current detection portion has a resistor element that converts a circuit current into a voltage and an average voltage detection portion that averages the voltage resulting from the conversion. The current drawing portion draws a current so that the average voltage detection portion has an output equal to a reference voltage (fifth configuration).

This configuration suppresses useless current drawing and thus can provide improved efficiency.

Furthermore, in the above-described third configuration, the switching current limit set voltage may be a voltage proportional to an input voltage of the LED drive circuit. This makes a switching current have a waveform of a shape proportional to the input voltage and thus can provide an improvement in power factor (sixth configuration).

Furthermore in the above-described third configuration, the LED current set voltage may be a voltage proportional to an average voltage of an input voltage of the LED drive circuit (seventh configuration). This allows light control to be performed over a wide range of phase angles.

Furthermore, in the above-described seventh configuration, the second offset voltage may be a voltage proportional to an edge voltage of the input voltage of the LED drive circuit. This can provide a light control curve approximating that of an incandescent lamp and thus allows light control to be performed in such a manner as to prevent a feeling of discomfort from being caused.

Furthermore, in the above-described seventh configuration, the second offset voltage may be a voltage obtained by squaring a voltage proportional to an edge voltage of the input voltage of the LED drive circuit. This can provide a light control curve further approximating that of an incandescent lamp and thus allows light control to be performed in such a manner as to further prevent a feeling of discomfort from being caused.

The present invention is also to provide an LED illumination component including: an LED drive circuit that can be connected to an alternating current power source via a phase-control light controller and drives an LED load; and the LED load that is connected on an output side of the LED drive circuit. The LED drive circuit includes: a switching power source portion having a switching element, a switching current detection portion that detects a switching current, and an LED current detection portion that detects an LED current; a first subtraction portion that subtracts a given value from an output of the switching current detection portion; a first determination portion that determines, through computation on a plurality of externally inputted voltages, a target value to which the switching current is limited; a second subtraction portion that subtracts a given value from an output of the LED current detection portion; a second determination portion that determines, through computation on a plurality of externally inputted voltages, a target value of the LED current; a switching current limitation portion that, if a result of the subtraction by the first subtraction portion exceeds a result of the determination by the first determination portion, switches off the switching element so as to limit the switching current; and an LED current control portion that drives the switching element to control the LED current so that a result of the subtraction by the second subtraction portion coincides with a result of the determination by the second determination portion.

DESCRIPTION OF THE PREFERRED EMBODIMENTS

Figure 1:
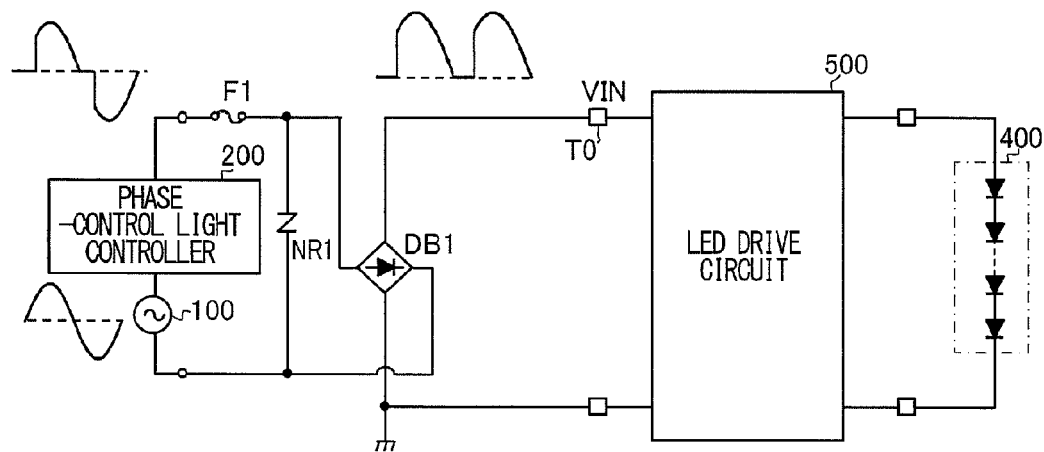
FIG. 1 is a diagram showing an entire configuration of an LED illumination system according to one embodiment of the present invention.

Hereinafter, an embodiment of the present invention will be described with reference to the appended drawings. FIG. 1 shows an entire configuration of an LED illumination system according to one embodiment of the present invention. As shown in FIG. 1, the LED illumination system according to the present invention includes a commercial power source 100, a phase-control light controller 200, a fuse F1, a surge protection element NR1, a diode bridge DB1, an LED drive circuit 500, and an LED array 400. The commercial power source 100 is connected to the diode bridge DB1 via the phase-control light controller 200 and the fuse F1, and the surge protection element NR1 is connected between one end of the commercial power source 100 and one end of the fuse F1. The LED drive circuit 500 is connected to an output side of the diode bridge DB1, and the LED array 400 is connected to an output side of the LED drive circuit 500. The LED drive circuit 500 and the LED array 400 constitute an LED illumination component, examples of which include an LED lamp.

The commercial power source 100 outputs a sinusoidal alternating current voltage that varies from country to country between 100 V to 250 V, and a frequency of 50 Hz or 60 Hz is used for the power source 100. When an alternating current voltage is inputted to the phase-control light controller 200, in accordance with the rotation or sliding operation for light control of a volume element, a waveform is generated that has a shape obtained by cutting away a certain phase point of an alternating current waveform. By the diode bridge DB1, full-wave rectification of an output waveform of the phase-control light controller 200 is performed, and a pulsation waveform having a frequency (100 Hz in a case of an input frequency of 50 Hz, and 120 Hz in a case of an input frequency of 60 Hz) double an input frequency is inputted to an input terminal T0 of the LED drive circuit 500.

Figure 2:
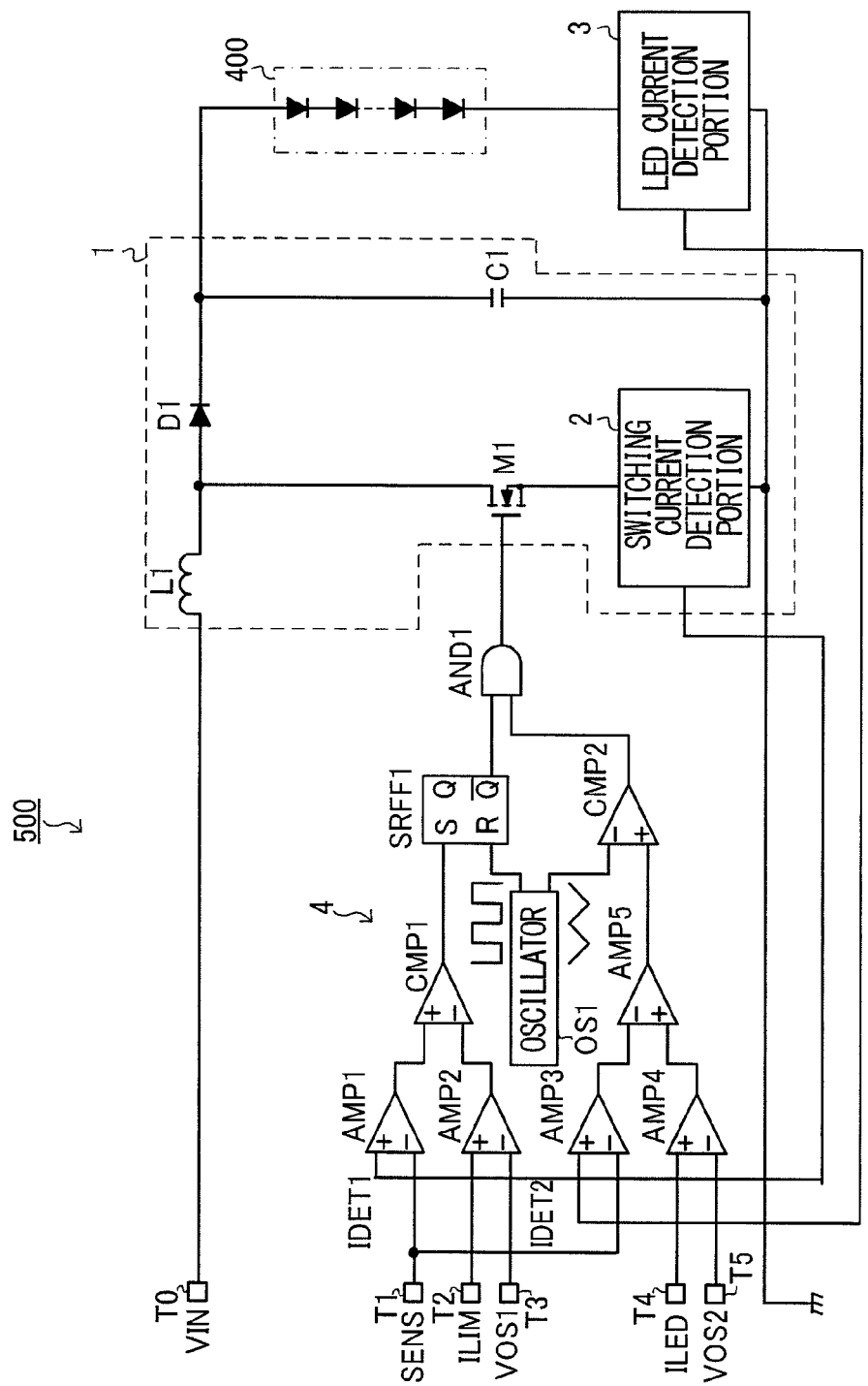
FIG. 2 is a diagram showing one configuration example of an LED drive circuit according to the present invention.

Now, FIG. 2 shows one configuration example of the LED drive circuit 500. The LED drive circuit 500 shown in FIG. 2 has a switching power source portion 1, an LED current detection portion 3, a switching control portion 4, and input terminals T0 to T5. The switching power source portion 1 is composed of an inductor L1, a diode D1, a capacitor C1, and a switching element M1 that is an nMOS transistor so as to form a booster circuit, and an input voltage VIN of the input terminal T0 is boosted by the switching power source portion 1. A forward voltage of the LED array 400 is set to be about double the input voltage, and the boosted voltage causes a current to flow through the LED array 400, and thus the LED array 400 emits light.

A switching current detection portion 2 that detects a switching current is connected between a source side of the switching element M1 and a ground, and the LED current detection portion 3 that detects a current flowing through LEDs is connected between a cathode side of the LED array 400 and the ground.

The switching control portion 4 has error amplifiers AMP1 to AMP5, comparators CMP1 and CMP2, an RS flip-flop SRFF1, an oscillator OS1, and an AND circuit AND1. An output voltage IDET1 of the switching current detection portion 2 is inputted to a non-inverting terminal of the error amplifier AMP1, and a reference voltage SENS applied to the input terminal T1 is inputted to an inverting terminal thereof. Furthermore, a switching current limit set voltage ILIM applied to the input terminal T2 is inputted to a non-inverting terminal of the error amplifier AMP2, and a first offset voltage VOS1 applied to the input terminal T3 is inputted to an inverting terminal thereof. The error amplifier AMP1 amplifies a difference of the inputs and outputs the amplified difference to a non-inverting terminal of the comparator CMP1, and the error amplifier AMP2 amplifies a difference between the inputs and outputs the amplified difference to an inverting terminal of the comparator CMP1. The comparator CMP1 outputs a result of a comparison made between the inputs to a set terminal of the RS flip-flop SRFF1. A rectangular wave signal outputted by the oscillator OS1 is inputted to a reset terminal of the RS flip-flop SRFF1, and an output from a Q-bar output terminal thereof is inputted to the AND circuit AND1.

Furthermore, an output voltage IDET2 of the LED current detection portion 3 is inputted to a non-inverting terminal of the error amplifier 3, and the reference voltage SENS applied to the input terminal T1 is inputted to an inverting terminal thereof. Furthermore, an LED current set voltage ILED applied to the input terminal T4 is inputted to a non-inverting terminal of the error amplifier AMP4, and a second offset voltage VOS2 applied to the input terminal T5 is inputted to an inverting terminal thereof. The error amplifier AMP3 amplifies a difference between the inputs and outputs the amplified difference to an inverting terminal of the error amplifier AMP5, and the error amplifier AMP4 amplifies a difference between the inputs and outputs the amplified difference to a non-inverting terminal of the error amplifier AMP5. The error amplifier AMP5 amplifies a difference between respective output voltages of the error amplifiers AMP3 and AMP4 and outputs the amplified difference to a non-inverting terminal of the comparator CMP2. A triangle wave signal outputted by the oscillator OS1 is inputted to an inverting terminal of the comparator CMP2. The comparator CMP2 outputs a result of a comparison made between the inputs to the AND circuit AND1. Then, an output of the AND circuit AND1 is inputted to a gate side of the switching element M1.

With the above-described configuration, when $$(IDET1-SENS)>(ILIM-VOS1),$$

an output of the comparator CMP1 becomes high in level and thus the RS flip-flop SRFF1 is set, so that an output of the AND circuit AND1 becomes low in level. Because of this, a gate of the switching element M1 becomes low in level and thus the switching element M1 is switched off to halt switching. As a result, a switching current is limited.

Furthermore, a PWM function takes place in which a duty ratio of an output pulse of the comparator CMP2 varies depending on an output level of the error amplifier AMP5, and thus a gate voltage of the switching element M1 is controlled in such a manner that feedback is performed so that $$(IDET2-SENS)=(ILED-VOS2).$$

As a result, an LED current is maintained constant.

Now, for the proper operation of the phase-control light controller 200, it is required that a current flow constantly so as to prevent a triac included in the phase-control light controller 200 from being switched off. In the present invention, voltages set appropriately on the basis of the input voltage VIN are applied to the input terminals T1 to T5, respectively, so that a switching current and an LED current are controlled finely so as to prevent the triac included in the phase-control light controller 200 from being switched off. This can suppress a phenomenon in which the light controller is brought to an unstable state to cause brightness flickering of the LEDs and can also achieve increased efficiency. Typically, the switching current limit set voltage ILIM to be applied to the input terminal T2 is set to be a given voltage, and the first offset voltage VOS1 to be applied to the input terminal T3 is set to be at a ground level. Furthermore, the reference voltage SENS to be applied to the input terminal T1 is set to be at the ground level. Voltages to be applied to the input terminals T4 and T5, respectively, will be described later.

The switching current limit set voltage ILIM to be applied to the input terminal T2 may be set to be a voltage proportional to the input voltage VIN. This makes a switching current have a waveform of a shape proportional to the input voltage VIN and thus provides an improvement in power factor.

Furthermore, there is also a characteristic that the boosting operation causes the capacitor C1 to store energy, and thus voltage application to the LED array 400 is stabilized, so that flickering is unlikely to occur.

Figure 3:
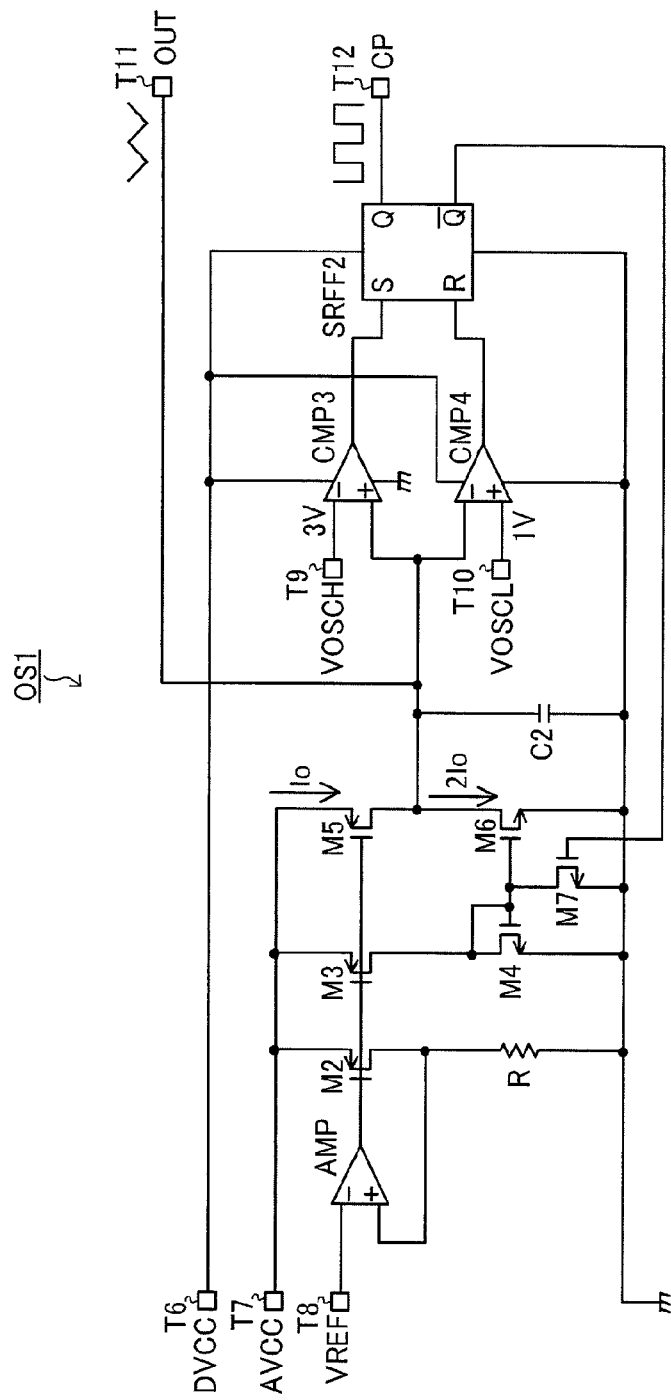
FIG. 3 is a diagram showing one configuration example of an oscillator.

FIG. 3 shows a specific configuration example of the oscillator OS1. The oscillator OS1 has a terminal T6 to which a digital direct current power source voltage DVCC is applied, a terminal T7 to which an analog direct current power source voltage AVCC is applied, a terminal T8 to which a reference voltage VREF is applied, a terminal T9 to which a reference voltage VOSCH is applied, a terminal T10 to which a reference voltage VOSCL (<VOSCH) is applied, and output terminals T11 and T12. The oscillator OS1 further has constant-current pMOS transistors M2, M3, and M5, constant-current nMOS transistors M4 and M6, and an nMOS transistor M7. In addition thereto, the oscillator OS1 has an operational amplifier AMP, a resistor R, a capacitor C2, comparators CMP3 and CMP4, and an RS flip-flop SRFF2.

If an output voltage OUT of the output terminal T11 attains a value not lower than the reference voltage VOSCH (=3 V), the RS flip-flop SRFF2 is set and thus a Q-bar output thereof becomes low in level, so that the nMOS transistor M7 is switched off and thus the constant-current nMOS transistor M6 is switched on to cause electric charge accumulated in the capacitor C2 to be discharged at a constant current IO. If, as a result of the discharge, the voltage of the capacitor C2 is lowered to a value not higher than the reference voltage VOSCL (=1V), the RS flip-flop SRFF2 is reset and thus the Q-bar output thereof becomes high in level, so that the nMOS transistor M7 is switched on and thus the constant-current nMOS transistor M6 is switched off. Thus, an operation of charging the capacitor C2 at the constant current IO is performed so as to cause oscillation at a constant frequency. As a result, a triangle wave signal is outputted from the output terminal T11, and a rectangular wave signal is outputted from the output terminal T12. The triangle wave signal is inputted to an inverting input of the comparator CMP2, and the rectangular wave signal is inputted to a reset terminal of the RS flip-flop SRFF1 (FIG. 2).

Figure 4:
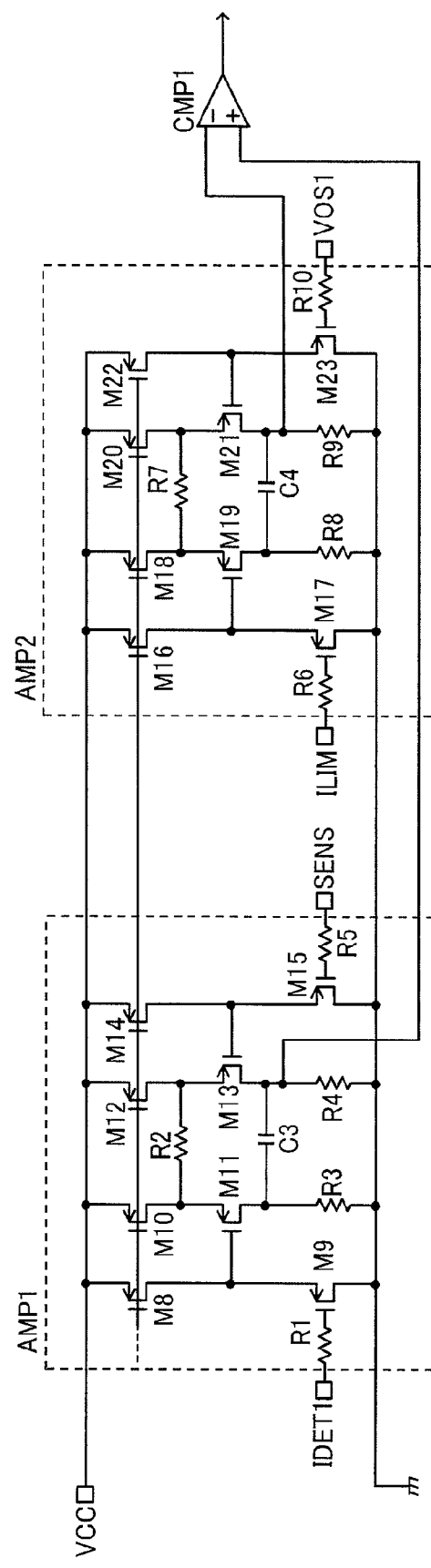
FIG. 4 is a diagram showing one configuration example of error amplifiers and a comparator.

FIG. 4 shows a specific configuration example of the error amplifiers AMP1 and AMP2. The error amplifier AMP1 is a transconductance amplifier composed of MOS transistors M8 to M15, resistors R1 to R5, and a capacitor C3. In the error amplifier AMP1, a difference between the switching current detection portion output voltage IDET1 and the reference voltage SENS is converted into a variation in current, which is then converted into a voltage by the resistor R4. The variation in current flowing through the resistor R4 is expressed by $$\Delta I1 = (2/gm + R2) \times (IDET1 - SENS)$$

where gm=a transconductance of the MOS transistors M11 and M13, and the voltage resulting from the conversion by the resistor 4 is expressed by $$\Delta V1 = R4 \times \Delta I1$$
$$= R4 \times (2/gm + R2) \times (IDET1 - SENS).$$

On the other hand, the error amplifier AMP2 is a transconductance amplifier composed of MOS transistors M16 to M23, resistors R6 to R10, and a capacitor C4. In the error amplifier AMP2, a difference between the switching current limit set voltage ILIM and the first offset voltage VOS1 is converted into a variation in current, which is then converted into a voltage by the resistor R9. The variation in current flowing through R9 is expressed by $$\Delta I2 = (2/gm + R7) \times (ILIM - VOS1)$$

where gm=a transconductance of the MOS transistors M19 and M21, and the voltage resulting from the conversion by the resistor R9 is expressed by $$\Delta V2 = R9 \times \Delta I2$$
$$= R9 \times (2/gm + R7) \times (ILIM - VOS1).$$

Assuming that R3=R4=R8=R9=RC, and R2=R7=RE, $$\Delta V1 = RC \times (2/gm + RE) \times (IDET1 - SENS)$$

$$\Delta V2 = RC \times (2/gm + RE) \times (ILIM - VOS1)$$

and a comparison is made between $\Delta V1$ and $\Delta V2$ by the comparator CMP1. In the configuration shown in FIG. 2, if $\Delta V1 > \Delta V2$, i.e. (IDET1−SENS)>(ILIM−VOS1), an output of the comparator CMP1 becomes high in level, so that the gate of the switching element M1 becomes low in level, and thus a switching current is limited.

Figure 5:
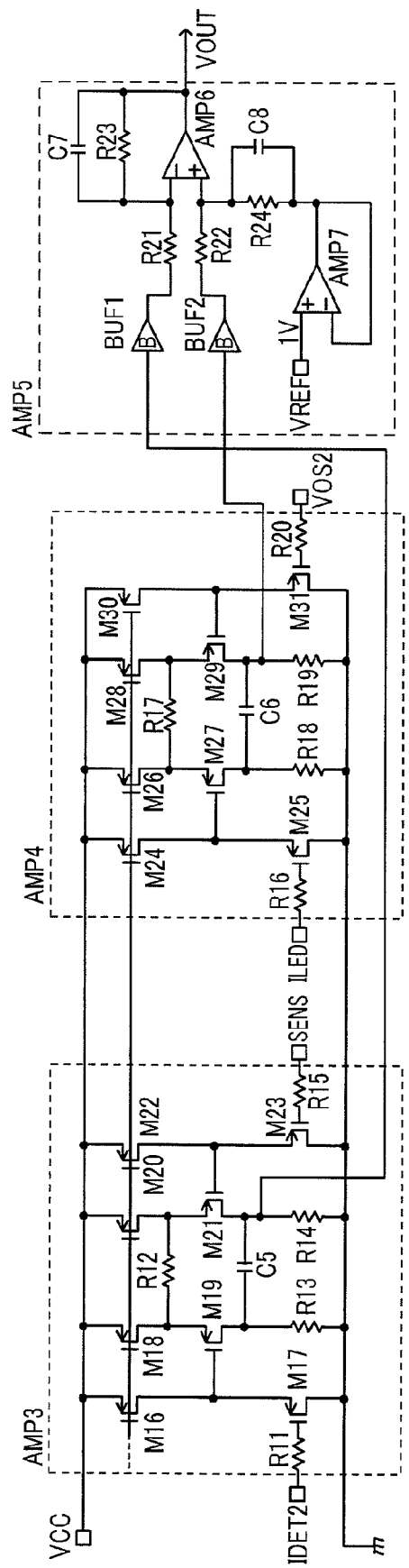
FIG. 5 is a diagram showing one configuration example of error amplifiers.

FIG. 5 shows a specific configuration example of the error amplifiers AMP3, AMP4, and AMP5. The error amplifier AMP3 is a transconductance amplifier composed of MOS transistors M16 to M23, resistors R11 to R15, and a capacitor C5. In the error amplifier AMP3, a difference between the LED current detection portion output voltage IDET2 and the reference voltage SENS is converted into a variation in current, which is then converted in to a voltage by the resistor R14. The variation in current flowing through the resistor R14 is expressed by $$\Delta I3 = (2/gm + R12) \times (IDET2 - SENS)$$

where gm=a transconductance of the MOS transistors M19 and M21, and the voltage resulting from the conversion by the resistor R14 is expressed by $$\Delta V3 = R14 \times \Delta I3$$
$$= R14 \times (2/gm + R12) \times (IDET2 - SENS).$$

On the other hand, the error amplifier AMP4 is a transconductance amplifier composed of MOS transistors M24 to M31, resistors R16 to R20, and a capacitor C6. In the error amplifier AMP4, a difference between the LED current set voltage ILED and the second offset voltage VOS2 is converted into a variation in current, which is then converted into a voltage by the resistor R19. The variation in current flowing through the resistor R19 is expressed by $$\Delta I4 = (2/gm + R17) \times (ILED - VOS2)$$

where gm=a transconductance of the MOS transistors M27 and M29, and the voltage resulting from the conversion by the resistor R19 is expressed by $$\Delta V4 = R19 \times \Delta I4$$
$$= R19 \times (2/gm + R17) \times (ILED - VOS2).$$

Assuming that R13=R14=R18=R19=RC, and R12=R17=RE, $$\Delta V3 = RC \times (2/gm + RE) \times (IDET2 - SENS)$$

$$\Delta V4 = RC \times (2/gm + RE) \times (ILED - VOS2).$$

The error amplifier AMP5 is composed of buffers BUF1 and BUF2, resistors R21 to R24, capacitors C7 and C8, and operational amplifiers AMP6 and AMP7 and amplifies a difference in output voltage between the error amplifiers AMP3 and AMP4.

Assuming that R21=R22=RIN, R23=R24=RF, and VREF=1V, an output voltage VOUT is expressed by $$VOUT = VREF + (R23/R21)(\Delta V4 - \Delta V3)$$
$$= 1V + (R23/R21) \times RC \times (2/gm + RE) \times$$
$$((ILED - VOS2) - (IDET2 - SENS)).$$

In the configuration shown in FIG. 2, through a boosting switching operation, feedback is performed so that VOUT=VREF, that is, $$\Delta V3 = \Delta V4, \text{ i.e. (ILED-VOS2)=(IDET2-SENS),}$$

and thus an LED current can be controlled so as to be constant.

As described above with reference to FIGS. 4 and 5, a transconductance amplifier is used to which a signal at a level equal to or higher than a GND level can be inputted, and thus the circuit can be simplified.

Figure 6:
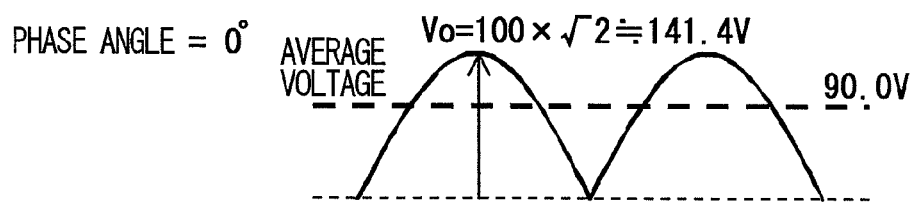
FIG. 6 is a diagram showing waveforms of a voltage inputted to the LED drive circuit in a case where a phase angle of a light controller is made to vary.
Figure 6:
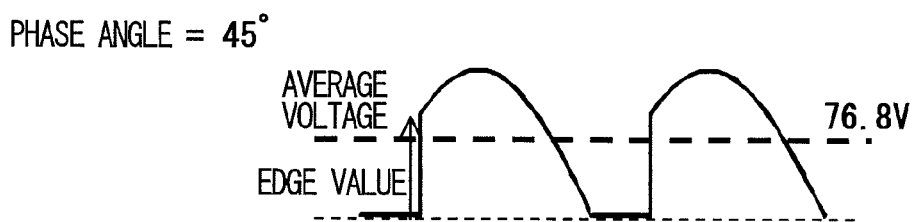
Figure 6:
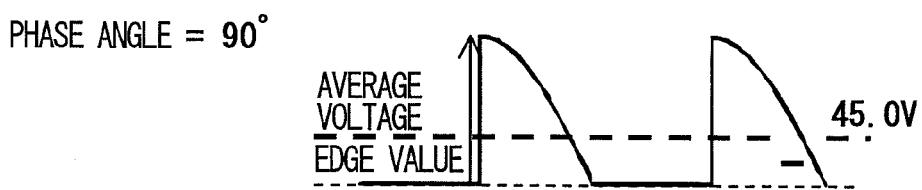
Figure 6:
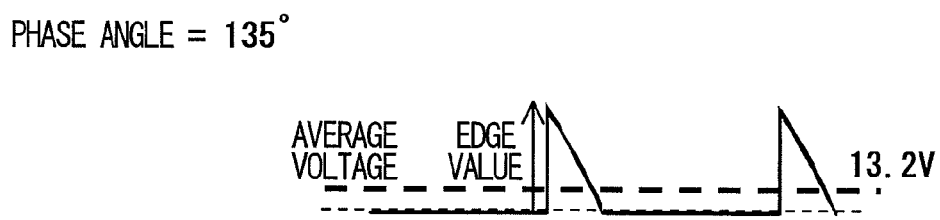

Next, the following describes light control performed in the present invention. FIG. 6 shows waveforms of a voltage inputted to the LED drive circuit 500 in cases where the phase angle of the phase-control light controller 200 is 0°, 45°, 90°, and 135°, respectively. Assuming an input voltage of 100 Vrms, a voltage peak value Vo is about 141.4 V, and an average voltage at these phase angles has values of 90.0 V, 76.8 V, 45.0 V, and 13.2 V, respectively. A phase angle θ of the phase-control light controller and the average voltage has a relationship expressed by Average voltage=$Vo(1+\cos(\theta))/\pi$.

Figure 7:
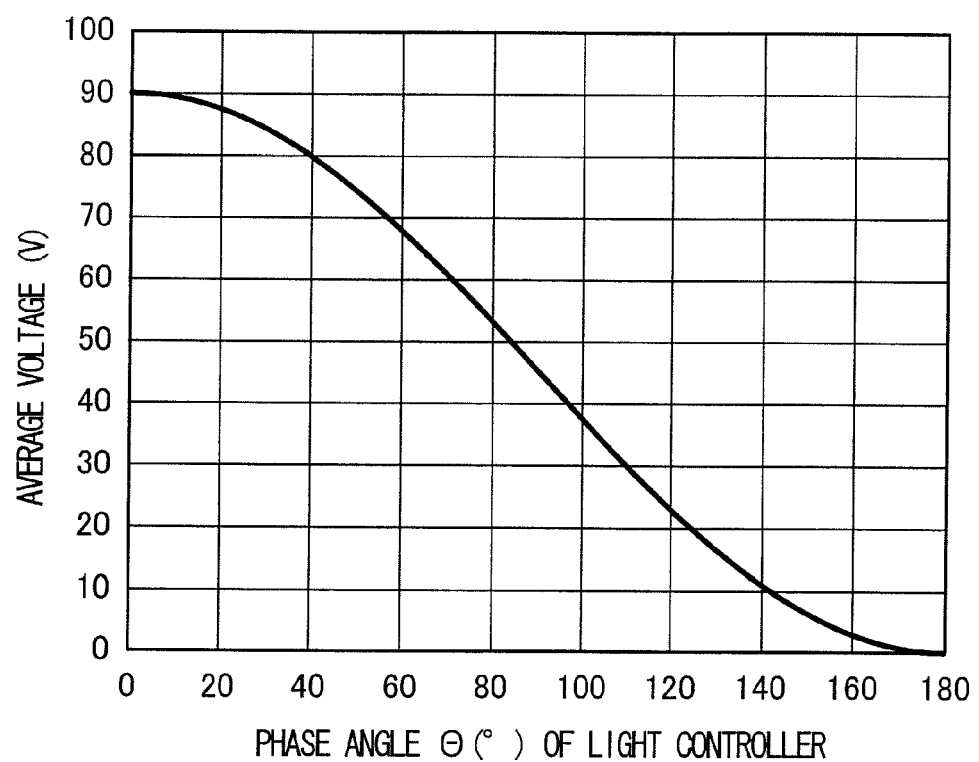
FIG. 7 is a graph showing a relationship between the phase angle of the light controller and an input voltage average value.
Figure 10:
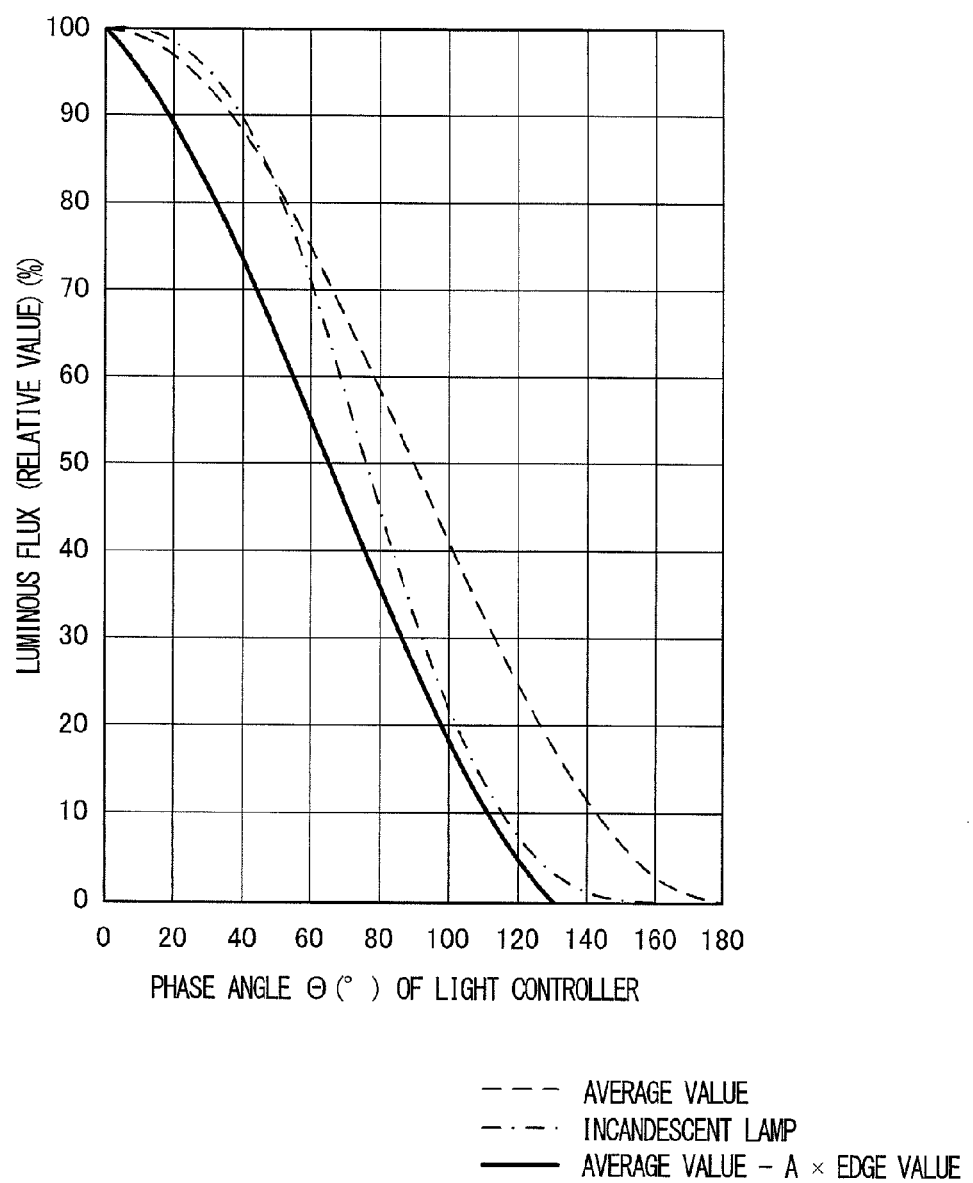
FIG. 10 is a graph showing a light control curve of an incandescent lamp and light control curves of the present invention.
Figure 18:
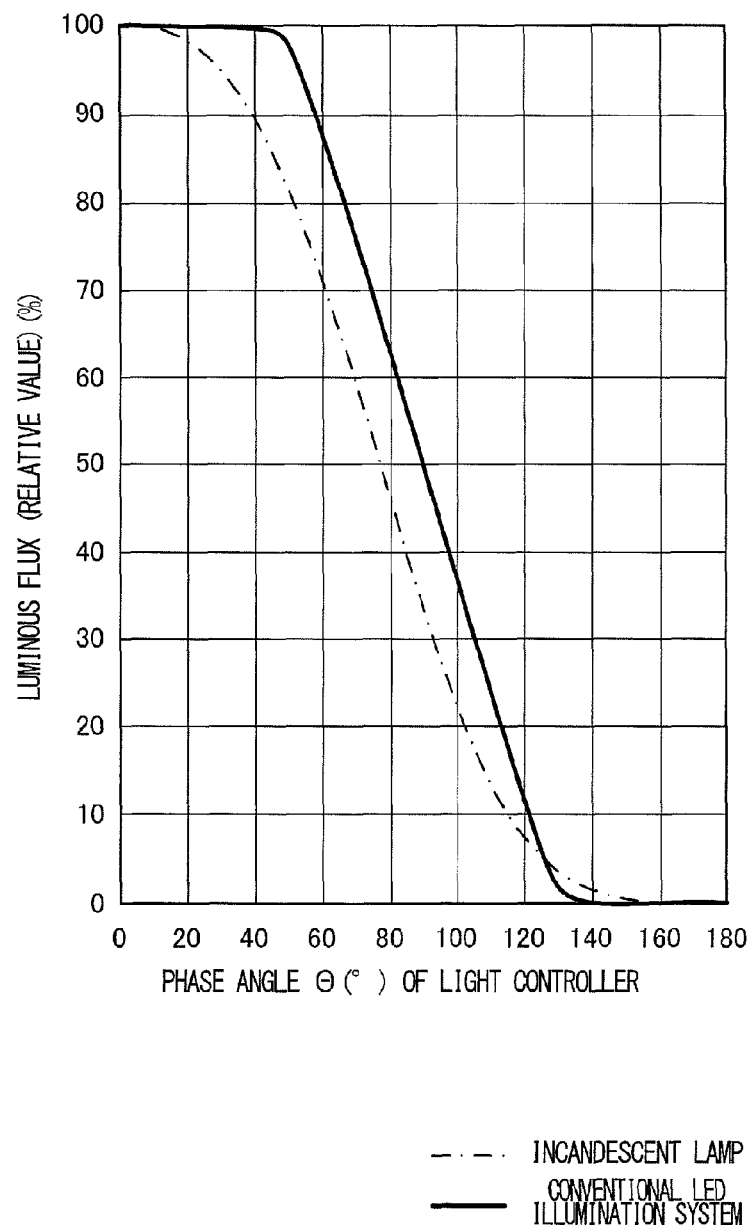
FIG. 18 is a graph showing light control curves of an incandescent lamp and the conventional LED illumination system, respectively.

FIG. 7 plots the relationship between the phase angle of the phase-control light controller and the average voltage. A voltage proportional to this average voltage is inputted as the LED current set voltage ILED to the input terminal T4 (the second offset voltage VOS2 is assumed to be at the ground level), so that an LED current commensurate with an average value of the input voltage is obtained, and thus light control of the LEDs can be performed so as to correspond to the phase angle of the light controller. A dotted line in FIG. 10 shows a light control curve obtained in this case. A comparison between this light control curve and the light control curve of the conventional LED illumination system shown in FIG. 18 indicates that the above-described case allows light control to be performed over a wider range of values of the phase angle θ. In order that a voltage proportional to the average value of the input voltage is outputted as the LED current set voltage ILED, the following configuration is adopted. That is, as shown in FIG. 8, the input voltage VIN is divided between resistors R25 and R26, and a resulting voltage is smoothed by the capacitor C9.

Figure 8:
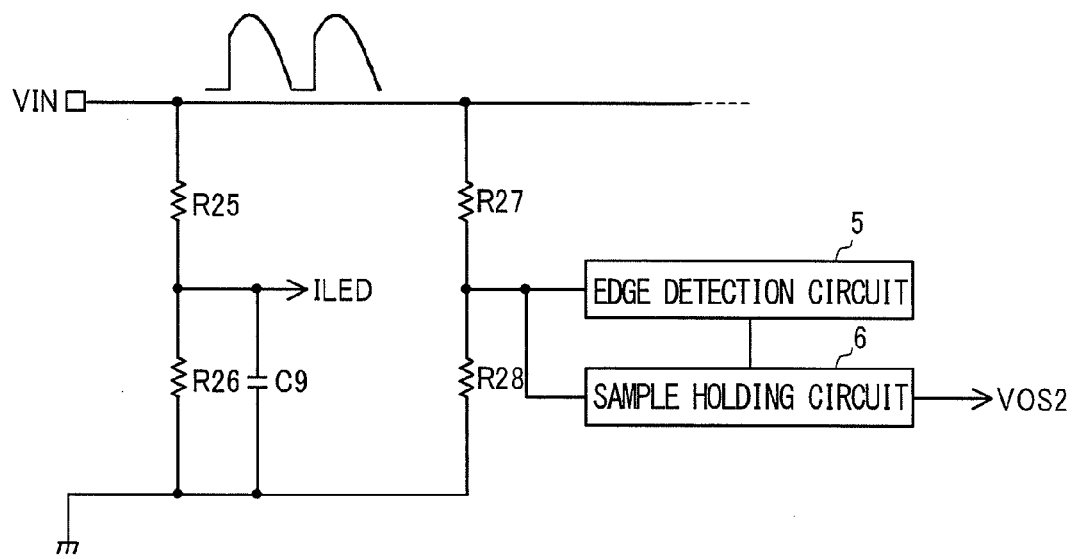
FIG. 8 is a diagram showing one example of a circuit that generates an LED current set voltage and a second offset voltage.

Moreover, it is possible that, as shown in FIG. 8, the input voltage VIN is divided between R27 and R28, and based on a resulting voltage, a voltage proportional to a voltage (edge voltage, see FIG. 6) of a rising part of the input voltage waveform is generated by an edge detection circuit 5 and a sample holding circuit 6, which is then inputted as the second offset voltage VOS2 to the input terminal T5.

The edge voltage is expressed by

Edge voltage=$Vo\times\sin(\theta)$, and a voltage proportional thereto is expressed by $A\times$edge voltage=$A\times Vo\times\sin(\theta)$ (A represents a proportionality constant). Hence, a light control curve obtained in this case is proportional to $(Vo\times(1+\cos(\theta))/\pi)-(A\times Vo\times\sin(\theta))$.

Figure 9:
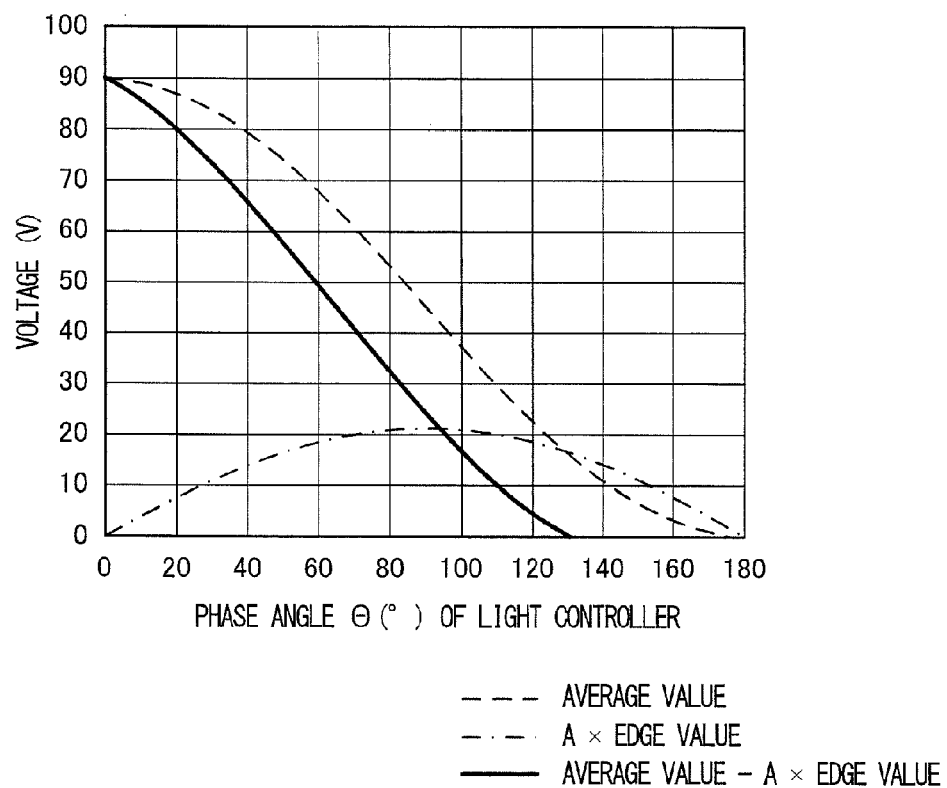
FIG. 9 is a graph showing a relationship between each of an input voltage average value, a voltage proportional to an edge voltage, and a difference between them, and the phase angle.

FIG. 9 shows a relationship between each of the input voltage average value, a voltage proportional to the edge voltage, and a difference between them, and the phase angle in a case where A=0.15 and Vo=141.4 V. Furthermore, a solid line in FIG. 10 shows a light control curve obtained in a case where a voltage proportional to the edge voltage is used. As is indicated by this, a property further approximating that represented by a light control curve of an incandescent lamp is obtained.

Figure 11:
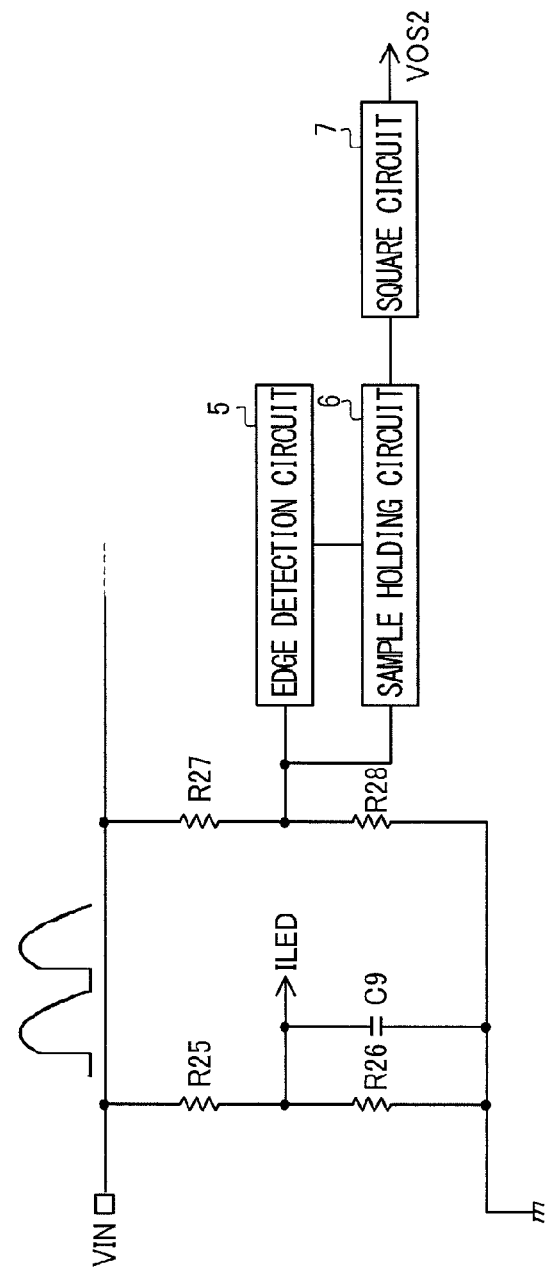
FIG. 11 is a diagram showing another example of the circuit that generates the LED current set voltage and the second offset voltage.

In addition, it is also possible that, as shown in FIG. 11, at an output of the sample holding circuit 6, a square circuit 7 is provided so as to generate a voltage obtained by squaring a voltage proportional to the edge voltage of the input voltage waveform, which is then inputted as the second offset voltage VOS2 to the input terminal T5.

A light control curve obtained in this case is proportional to $(Vo\times(1+\cos(\theta))/\pi)-(A\times Vo\times\sin(\theta))^2$.

Figure 12:
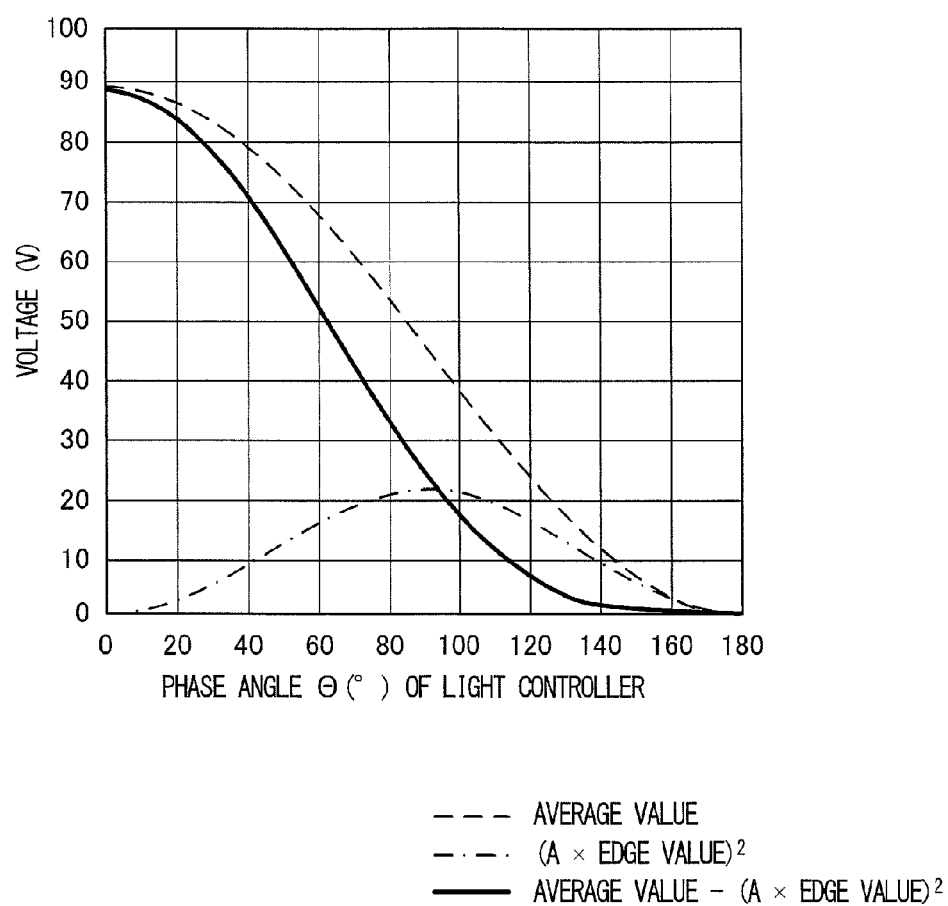
FIG. 12 is a graph showing a relationship between each of an input voltage average value, a square value of a voltage proportional to an edge voltage, and a difference between them, and the phase angle.
Figure 13:
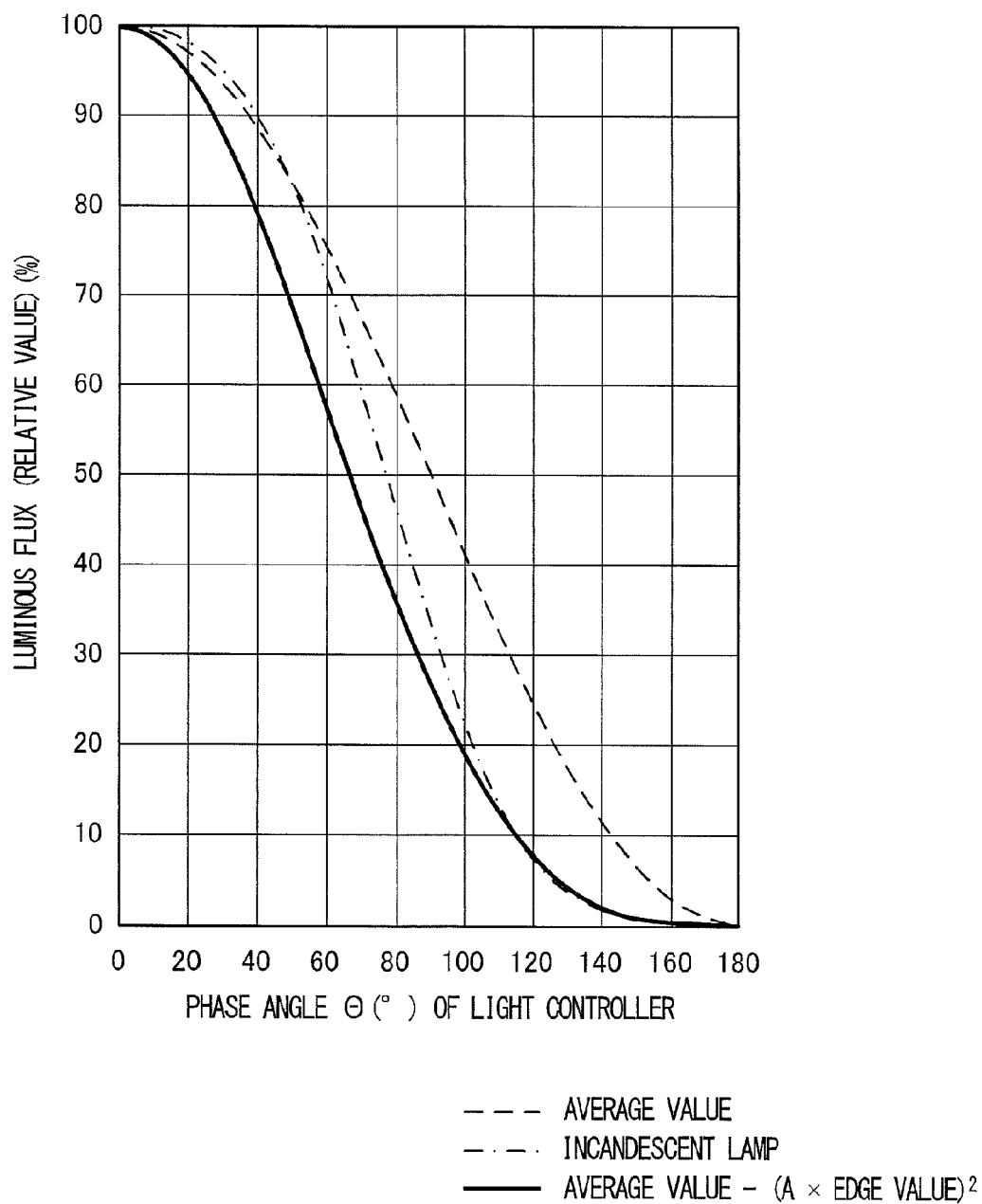
FIG. 13 is a graph showing a light control curve of the incandescent lamp and light control curves of the present invention.

FIG. 12 shows a relationship between each of the input voltage average value, a square value of a voltage proportional to the edge voltage, and a difference between them, and the phase angle in a case where $A^2$=0.15/141.4 and Vo=141.4 V. Furthermore, a solid line in FIG. 13 shows a light control curve obtained in a case where a square value of a voltage proportional to the edge voltage is used. As is indicated by this, compared with the light control curve shown by the solid line in FIG. 10, this light control curve, at a part thereof representing low illuminance at large phase angles, further approximates the light control curve of the incandescent lamp.

As discussed above, when mounted to an already-existing light controller for an incandescent lamp, the LED illumination component of the present invention can provide light control properties similar to those provided by an incandescent lamp, and thus light control thereof causes no feeling of discomfort.

Figure 14:
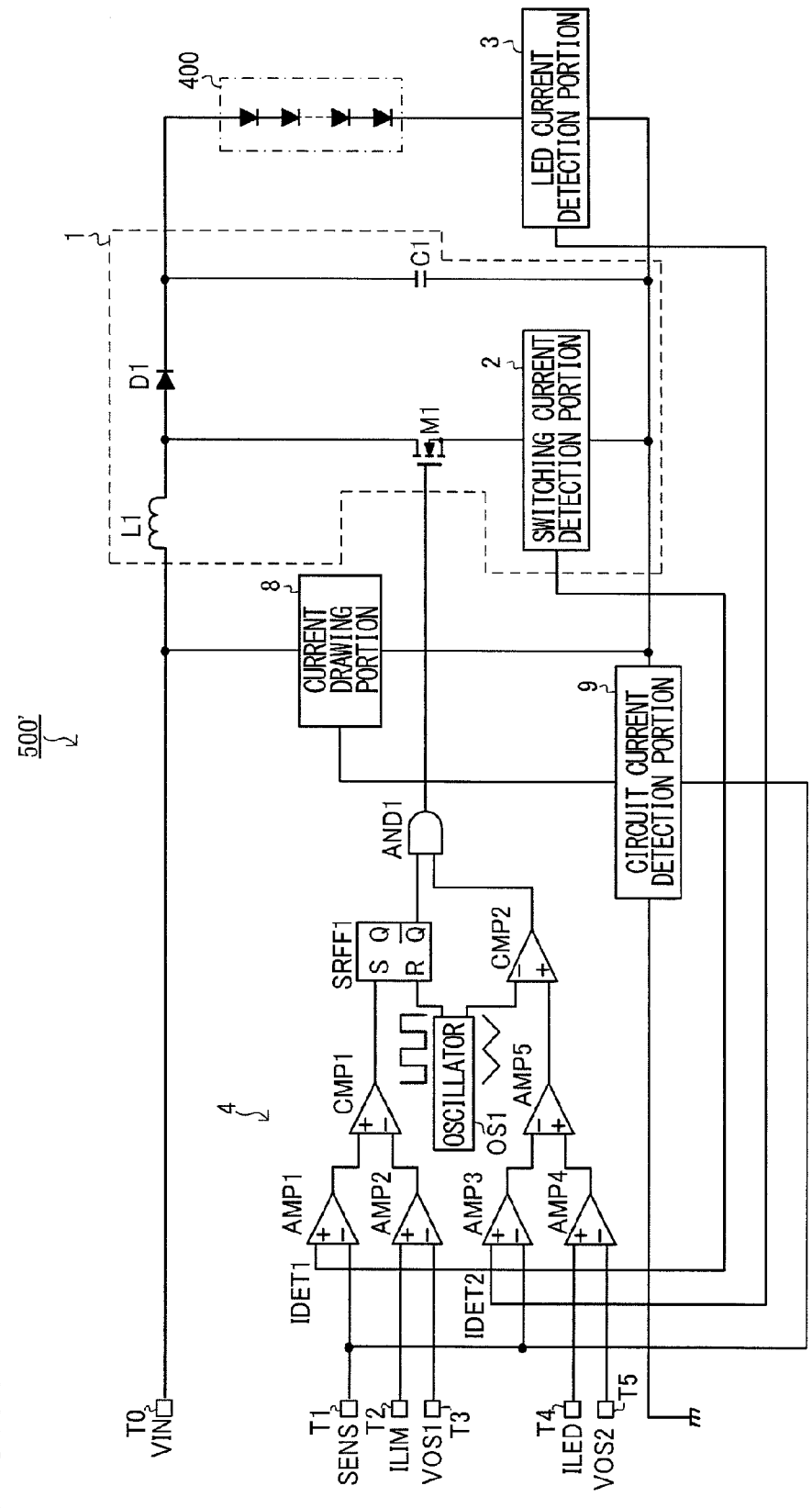
FIG. 14 is a diagram showing another configuration example of the LED drive circuit according to the present invention.

Furthermore, FIG. 14 shows a configuration of an LED drive circuit according to another embodiment of the present invention. An LED drive circuit 500' shown in FIG. 14 has a configuration in which a circuit current detection portion 9 is inserted between a ground and each of one end of a switching current detection portion 2 and one end of an LED current detection portion 3, and a current drawing portion 8 is inserted between an input voltage line and one end of the circuit current detection portion 9. Furthermore, a detection signal of the circuit current detection portion 9 is inputted as a reference voltage SENS to each of error amplifiers AMP1 and AMP3. The circuit current detection portion 9 detects currents in the entire circuit, and based on a detection signal obtained as a result of the detection, the current drawing portion 8 draws a current so that a total of a switching current, an LED current, and the drawn current has a constant value. This can suppress a phenomenon in which the triac included in the phase-control light controller 200 is switched off to bring light emission of the LEDs to an unstable state.

Figure 15:
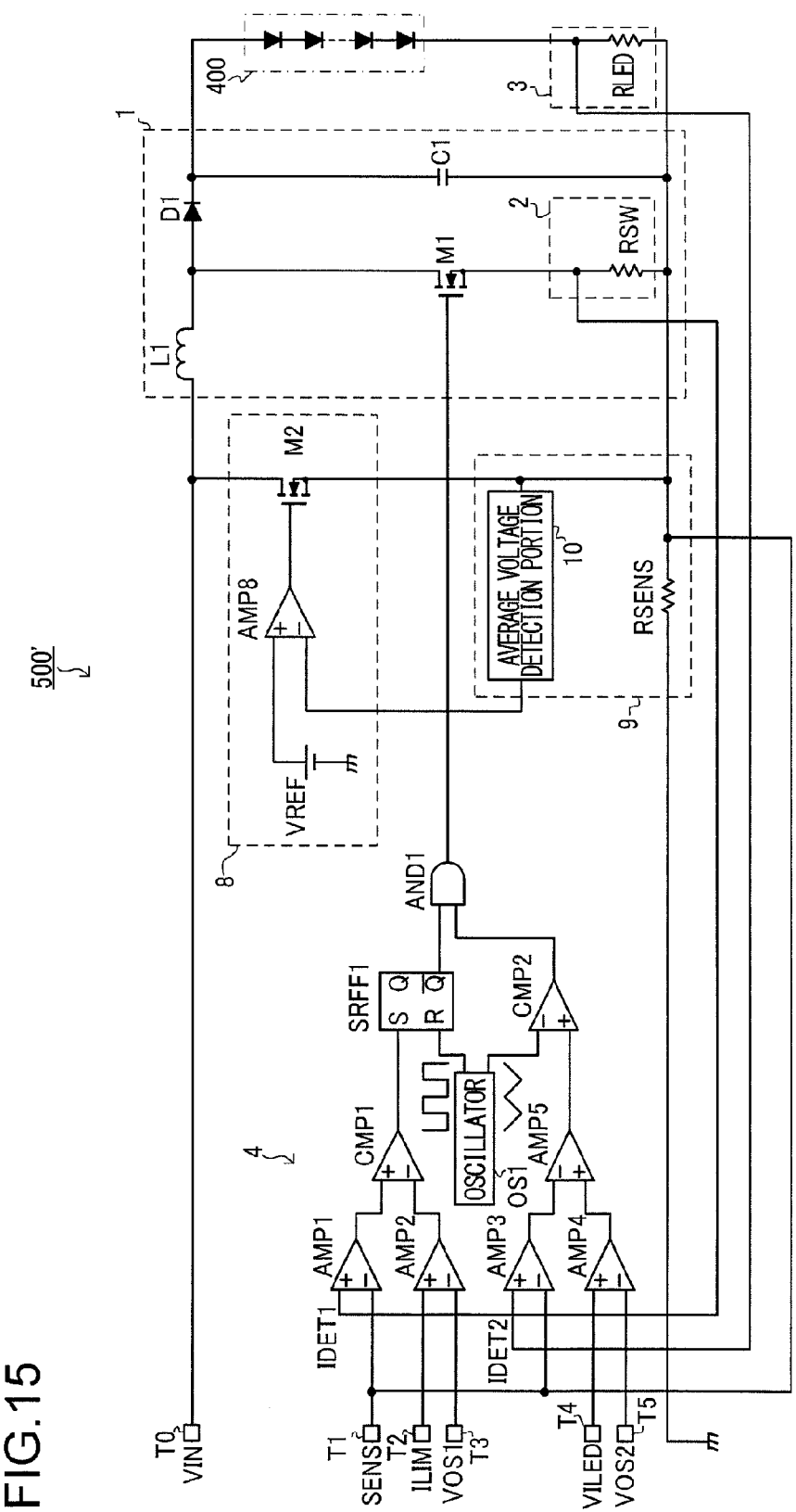
FIG. 15 is a diagram showing a specific configuration example of the LED drive circuit shown in FIG. 14.
Figure 16:
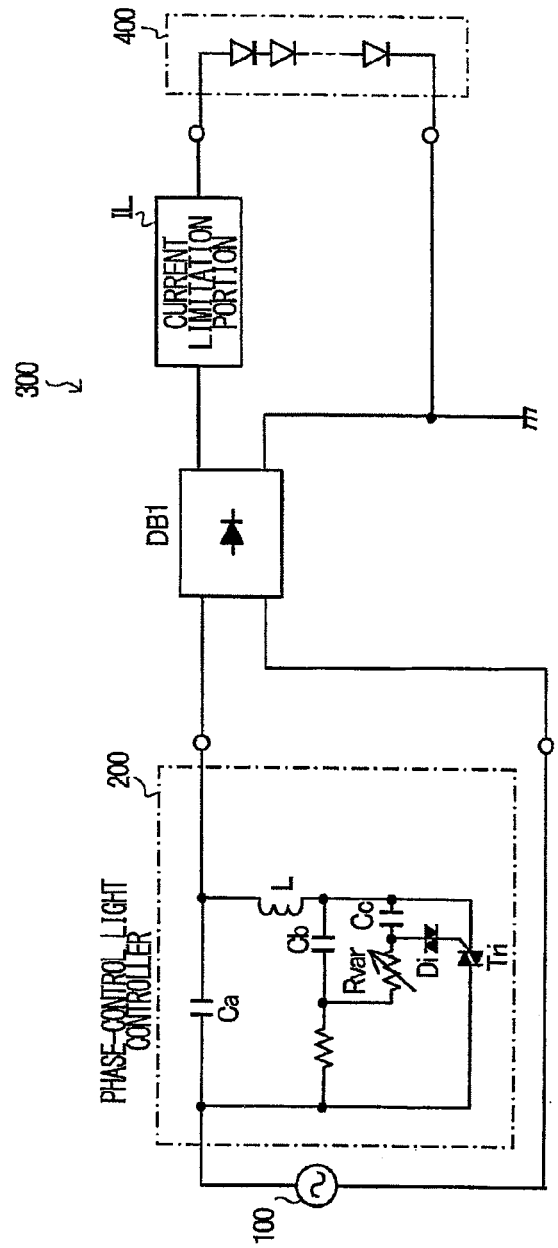
FIG. 16 is a diagram showing a conventional example of an LED illumination system.
Figure 17:
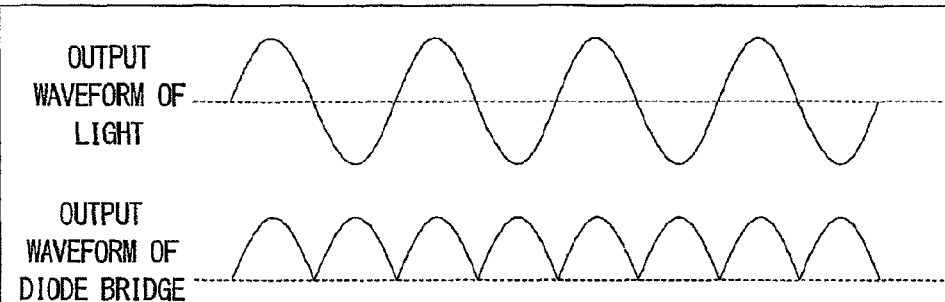
FIG. 17 is a diagram showing output waveforms of the light controller and output waveforms of a diode bridge in a case where the phase angle of the light controller varies.
Figure 17:
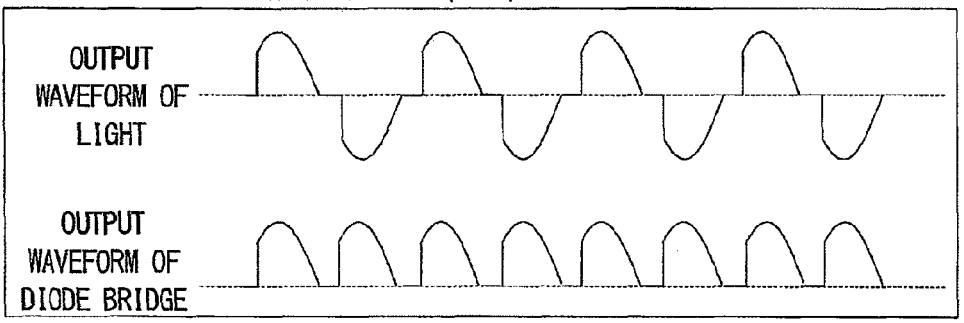
Figure 17:
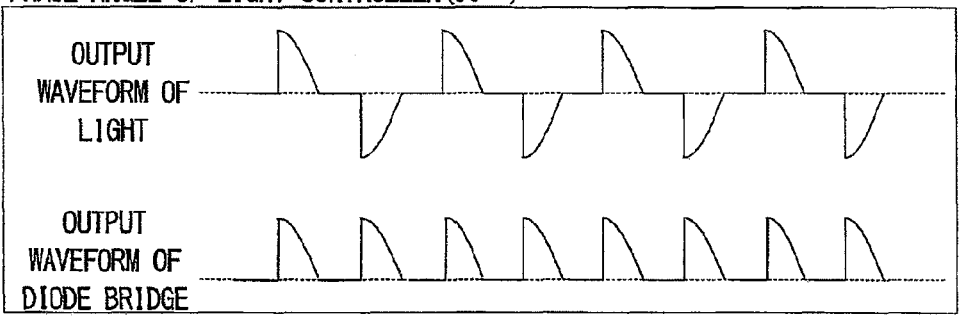
Figure 17:
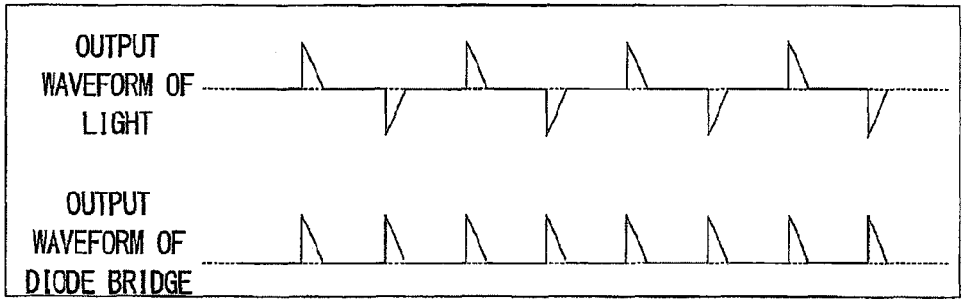

FIG. 15 shows a more specific configuration example of the LED drive circuit 500'. As the switching current detection portion 2, a resistor RSW is used to convert a switching current flowing through a switching element M1 into a voltage that is then inputted as a switching current detection portion output voltage IDET1 to the error amplifier AMP1. Furthermore, as the LED current detection portion 3, a resistor RLED is used to convert an LED current flowing through an LED array 400 into a voltage that is then inputted as an LED current detection portion output voltage IDET2 to the error amplifier AMP3. Furthermore, the circuit current detection portion 9 that detects currents in the entire circuit is composed of a resistor RSENS and an average voltage detection portion 10. The current drawing portion 8 has a reference voltage source VREF, an error amplifier AMP8, and an nMOS transistor M2. The average voltage detection portion 10 detects an average value of a voltage resulting from the voltage conversion by the resistor RSENS. The error amplifier AMP8 amplifies a difference between the average voltage detected by the average voltage detection portion 10 and a reference voltage VREF and passes a constant current through the nMOS transistor M2 so that driving the nMOS transistor M2 allows a current having a constant average value to flow through the resistor RSENS. Control is thus performed so as to prevent the triac in the phase-control light controller from being switched off.

Due to a switching current being a pulsing current, a voltage across the resistor RSENS is increased and decreased in a cycle synchronized with switching. A voltage detected by the resistor RSENS, however, is smoothed by the average voltage detection portion 10, so that useless current drawing is prevented, and thus efficiency of the LED drive circuit can be improved.

What is claimed is:

1. An LED drive circuit that can be connected to an alternating current power source via a phase-control light controller and drives an LED load, comprising:
   a switching power source portion having a switching element, a switching current detection portion that detects a switching current, and an LED current detection portion that detects an LED current;
   a first subtraction portion that subtracts a given value from an output of the switching current detection portion;
   a first determination portion that determines, through computation on a plurality of externally inputted voltages, a target value to which the switching current is limited;
   a second subtraction portion that subtracts a given value from an output of the LED current detection portion;
   a second determination portion that determines, through computation on a plurality of externally inputted voltages, a target value of the LED current;
   a switching current limitation portion that, if a result of the subtraction by the first subtraction portion exceeds a result of the determination by the first determination portion, switches off the switching element so as to limit the switching current; and
   an LED current control portion that drives the switching element to control the LED current so that a result of the subtraction by the second subtraction portion coincides with a result of the determination by the second determination portion.

2. The LED drive circuit according to claim 1, wherein the switching power source portion is formed of a booster circuit.

3. The LED drive circuit according to claim 1, wherein the first subtraction portion is a first error amplifier that obtains a difference between an output voltage of the switching current detection portion and a reference voltage,
   the first determination portion is a second error amplifier that obtains a difference between a switching current limit set voltage and a first offset voltage,
   the second subtraction portion is a third error amplifier that obtains a difference between an output voltage of the LED current detection portion and the reference voltage,
   the second determination portion is a fourth error amplifier that obtains a difference between an LED current set voltage and a second offset voltage,
   the switching current limitation portion has a comparator that compares an output of the first error amplifier with an output of the second error amplifier, and switches off the switching element based on an output of the comparator, and
   the LED current control portion has a fifth error amplifier that obtains a difference between an output of the third error amplifier and an output of the fourth error amplifier and a PWM signal generation portion that generates a PWM signal in accordance with an output of the fifth error amplifier, and drives the switching element based on the PWM signal.

4. The LED drive circuit according to claim 3, further comprising:
   a circuit current detection portion that detects currents in the entire circuit; and
   a current drawing portion that draws a current,
   wherein an output of the circuit current detection portion is used as the reference voltage, and
   based on the output of the circuit current detection portion, the current drawing portion draws the current so that the currents in the entire circuit are made constant.

5. The LED drive circuit according to claim 4, wherein the circuit current detection portion has a resistor element that converts a circuit current into a voltage and an average voltage detection portion that averages the voltage resulting from the conversion, and
   the current drawing portion draws a current so that the average voltage detection portion has an output equal to a reference voltage.

6. The LED drive circuit according to claim 3, wherein the switching current limit set voltage is a voltage proportional to an input voltage of the LED drive circuit.

7. The LED drive circuit according to claim 3, wherein the LED current set voltage is a voltage proportional to an average voltage of an input voltage of the LED drive circuit.

8. The LED drive circuit according to claim 7, wherein the second offset voltage is a voltage proportional to an edge voltage of the input voltage of the LED drive circuit.

9. The LED drive circuit according to claim 7, wherein the second offset voltage is a voltage obtained by squaring a voltage proportional to an edge voltage of the input voltage of the LED drive circuit.

10. An LED illumination component, comprising:
    an LED drive circuit that can be connected to an alternating current power source via a phase-control light controller and drives an LED load, the LED drive circuit comprising:
    a switching power source portion having a switching element, a switching current detection portion that detects a switching current, and an LED current detection portion that detects an LED current;
    a first subtraction portion that subtracts a given value from an output of the switching current detection portion;
    a first determination portion that determines, through computation on a plurality of externally inputted voltages, a target value to which the switching current is limited;
    a second subtraction portion that subtracts a given value from an output of the LED current detection portion;
    a second determination portion that determines, through computation on a plurality of externally inputted voltages, a target value of the LED current;
    a switching current limitation portion that, if a result of the subtraction by the first subtraction portion exceeds a result of the determination by the first determination portion, switches off the switching element so as to limit the switching current; and
    an LED current control portion that drives the switching element to control the LED current so that a result of the subtraction by the second subtraction portion coincides with a result of the determination by the second determination portion; and the LED load that is connected to an output side of the LED drive circuit.

\* \* \* \* \*